(No Model.)
J. FORSYTH.
Curry Comb.
No. 239,756.　　　　　Patented April 5, 1881.
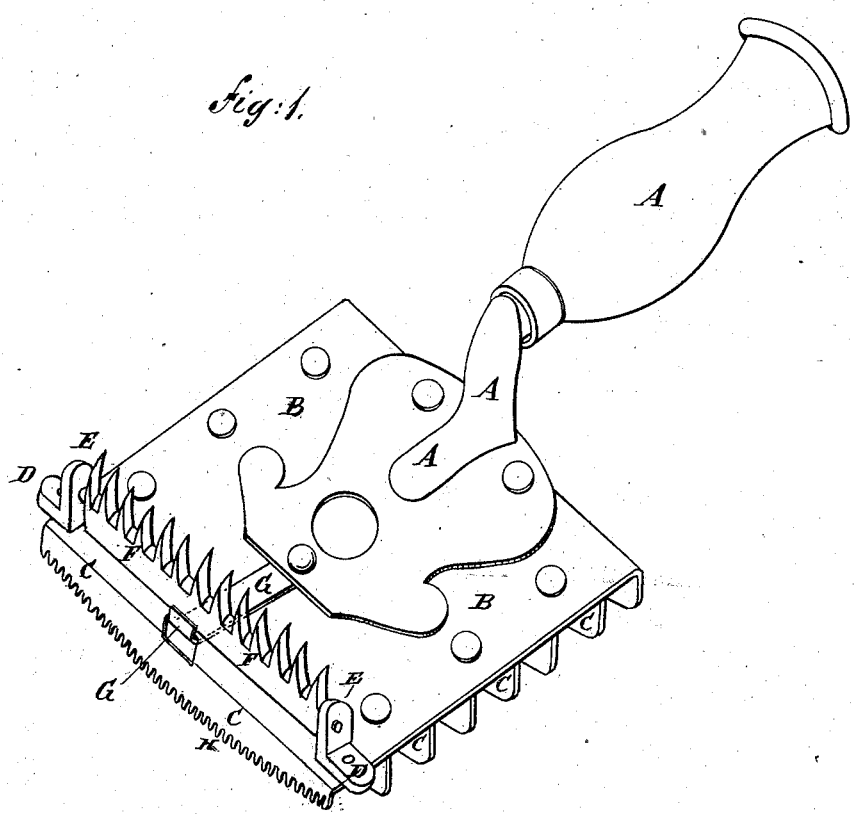
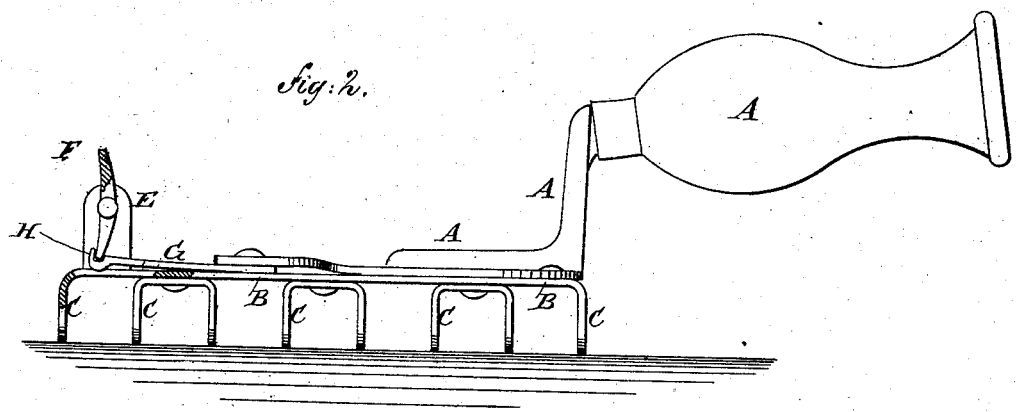
WITNESSES:
Chas. Nida
C. Sedgwick
INVENTOR:
J. Forsyth
BY Munn & Co
ATTORNEYS.

UNITED STATES PATENT OFFICE.

JAMES FORSYTH, OF NEW YORK, N. Y.

CURRY-COMB.

SPECIFICATION forming part of Letters Patent No. 239,756, dated April 5, 1881.

Application filed December 21, 1880. (No model.)

*To all whom it may concern:*

Be it known that I, JAMES FORSYTH, of the city, county, and State of New York, have invented a new and useful Improvement in Curry-Combs, of which the following is a specification, reference being had to the accompanying drawings, forming part thereof, in which—

Figure 1 is a perspective view, and Fig. 2 is a central sectional view.

The object of this invention is to furnish curry-combs so constructed that they can be readily adjusted for combing the manes and tails of horses and scraping sweat, dust, and mud from the horses.

The invention consists in constructing a curry-comb with a reversible comb upon its back, projecting arms to support the comb, and a spring-catch for holding the reversible comb in either position, whereby the said comb can be adjusted for use as a mane-comb and as a sweat-scraper, as will be hereinafter fully described.

A represents the handle of a curry-comb; B, the back-plate, and C, the combs for currying the horses, which combs are constructed and attached to the forward side of the plate B in the ordinary manner.

To the forward corners of the back-plate B are attached the knockers D, which project beyond the side edges of the back-plate B, so that they can be struck against a stall-post or other object to jar the dust and hairs from the curry-comb, and thus keep it clear. The knockers D are made with projecting arms E upon their inner ends, which arms E are perforated to receive pivots formed upon the ends of the mane-comb F. The arms E may be made separate from the knockers D and attached directly to the back-plate B, if desired.

The mane-comb F is separate from the back-plate B, and is made with a smooth rear edge, so that the said comb can be adjusted with its teeth outward for use in combing the manes and tails of horses, and with its smooth rear edge outward for scraping off sweat, mud, and other dirt from the bodies and legs of horses.

G is a spring, the inner end of which is secured, by a rivet or other suitable means, to the middle part of the back-plate B. The outer end of the spring G passes beneath the mane-comb F, and has a cross groove or recess, H, formed in it to receive the rear edge or the points of the teeth of the said mane-comb F, to hold the comb securely in either position. The back-plate B and the forward comb, C, are recessed, notched, or slatted beneath the forward part of the spring-catch G, so that the said spring-catch G can be pressed back to allow the comb to be reversed or adjusted, according as it is desired to use it for combing or scraping.

Having thus described my invention, I claim as new and desire to secure by Letters Patent—

1. As an improved article of manufacture, a curry-comb, A B C, provided with a reversible combined mane-comb and sweat-scraper, secured to the forward edge of the back by journals, substantially as herein shown and described.

2. In a curry-comb, the combination, with the back-plate B and the reversible comb F, of the spring-catch G, substantially as herein shown and described, whereby the said comb will be held securely in either position, as set forth.

JAMES FORSYTH.

Witnesses:
JAMES T. GRAHAM,
C. SEDGWICK.